United States Patent

Johne

Patent Number: 6,109,841
Date of Patent: Aug. 29, 2000

[54] DRILLING TOOL WITH REPLACEABLE BIT

[75] Inventor: Frank Johne, Lohne, Germany

[73] Assignee: Johne & Co., Präsisionswerkzeuge GmbH, Dorsten, Germany

[21] Appl. No.: 09/068,622

[22] PCT Filed: Nov. 6, 1996

[86] PCT No.: PCT/EP96/04854

§ 371 Date: Jul. 21, 1998

§ 102(e) Date: Jul. 21, 1998

[87] PCT Pub. No.: WO97/17153

PCT Pub. Date: May 15, 1997

[30] Foreign Application Priority Data

Nov. 7, 1995 [DE] Germany ............... 195 43 233

[51] Int. Cl.⁷ ............................. B23B 51/02
[52] U.S. Cl. .................. 408/144; 408/224; 408/226; 408/231; 408/233; 408/713
[58] Field of Search ................. 408/199, 144, 408/231, 232, 233, 224, 225, 226, 230, 713

[56] References Cited

U.S. PATENT DOCUMENTS

| 748,890 | 1/1904 | Taylor et al. | 408/231 |
|---|---|---|---|
| 932,071 | 8/1909 | Urbscheit | 408/233 |
| 2,259,611 | 10/1941 | Burger | 408/230 |
| 3,994,615 | 11/1976 | Narang | 408/233 |
| 5,399,051 | 3/1995 | Aken et al. | 408/233 |
| 5,452,971 | 9/1995 | Nevills | 408/713 |
| 5,836,726 | 11/1998 | Berglund et al. | 408/230 |

FOREIGN PATENT DOCUMENTS

| 0 138 336 A1 | 4/1985 | European Pat. Off. | |
| 118806 | 11/1987 | European Pat. Off. | 408/713 |
| 367011 | 1/1923 | Germany. | |
| 2 246 965 | 4/1974 | Germany. | |
| 33 06 209 C2 | 8/1984 | Germany. | |
| 36 16 230 A1 | 11/1987 | Germany. | |
| 37 09 878 C2 | 10/1988 | Germany. | |
| 55104 | 3/1991 | Japan | 408/144 |
| WO 89/08519 | 9/1989 | WIPO. | |
| WO 92/20483 | 11/1992 | WIPO. | |

Primary Examiner—Daniel W. Howell
Attorney, Agent, or Firm—Cohen, Pontani, Lieberman & Pavane

[57] ABSTRACT

A drilling tool is proposed comprising a shaft which has both a chuck shaft suitable for fitting in machine tools and a drill-holding shaft, known per se, with chuck grooves and (optionally) coolant ducts. A replaceable drill bit (1) is fitted in a positive fit and detachably on the shaft. The drill bit can consist of a homogenous material and has cutting edges (2) inclined radially outwards and backwards; these cutting edges can be formed in one piece from the drill bit material or are composed of blades mounted in the central region and made from the drill bit material and complementary blades orignating from a cutter plate screwed onto the drill bit. The invention proposes that the cutting edges (2) should be aligned symmetrically about the drill bit axis and the cutting edges should be in cutting engagement over the entire radius of the bore to be drilled. Special securing devices comprising a pin with a fixing bore (7) and carrier grooves (5) on the outer circumference of the drill bit make it possible to fix the drill bit in matching securing devices on the drill shaft. In one particular embodiment, the drill bit in the drill shaft is clamped on matching wedge-shaped fitting surfaces. The invention is used preferably for spot drilling or boring of solid material as well as packet drilling and spot drilling of oblique surfaces of workpieces, the preferred diameter range being 5 to 50 mm. The drill bit can be re-ground or fitted with new screw-cutting plates or replaced after use with a new plate by simply releasing the positive-fit mount.

39 Claims, 8 Drawing Sheets

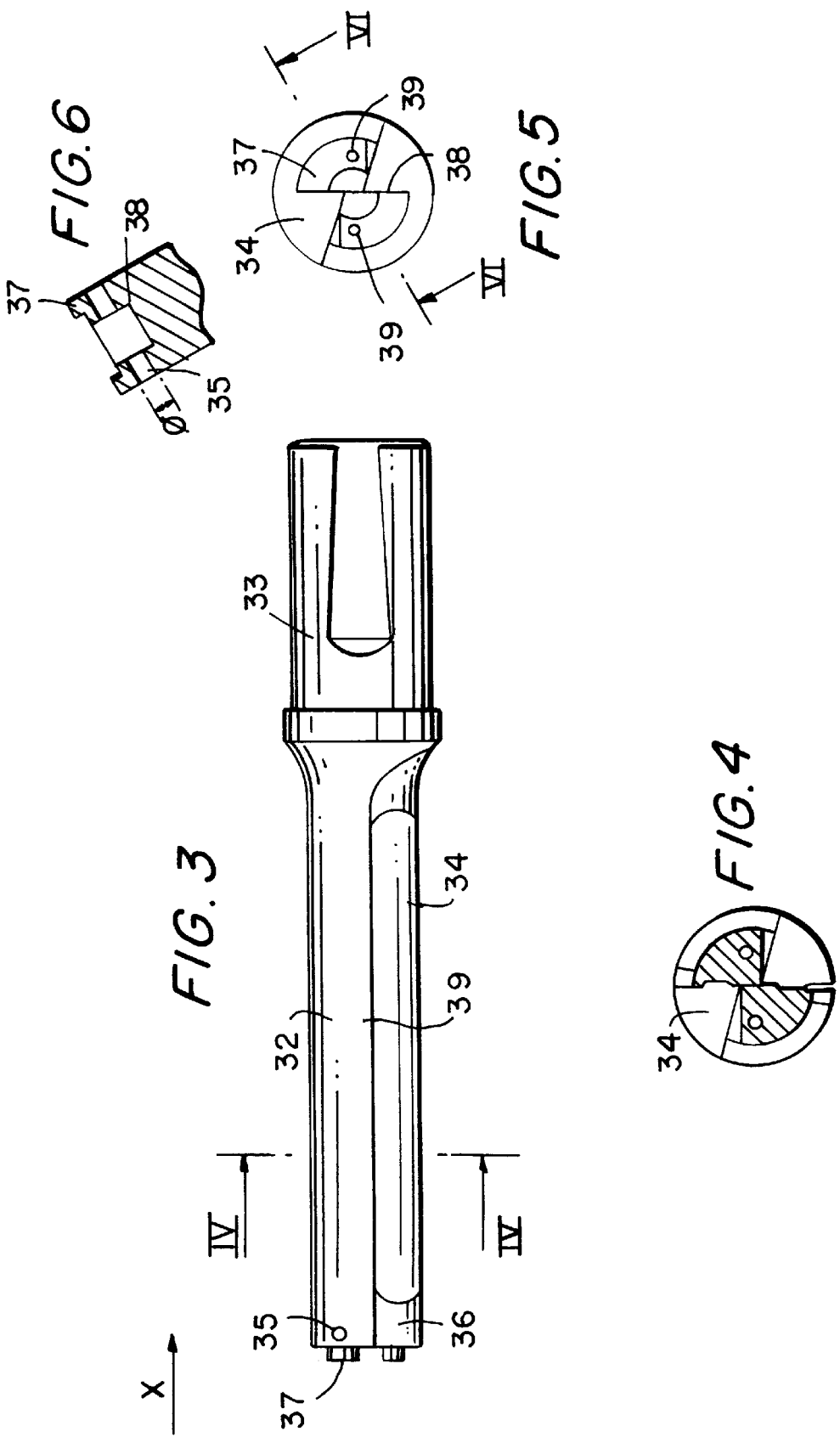

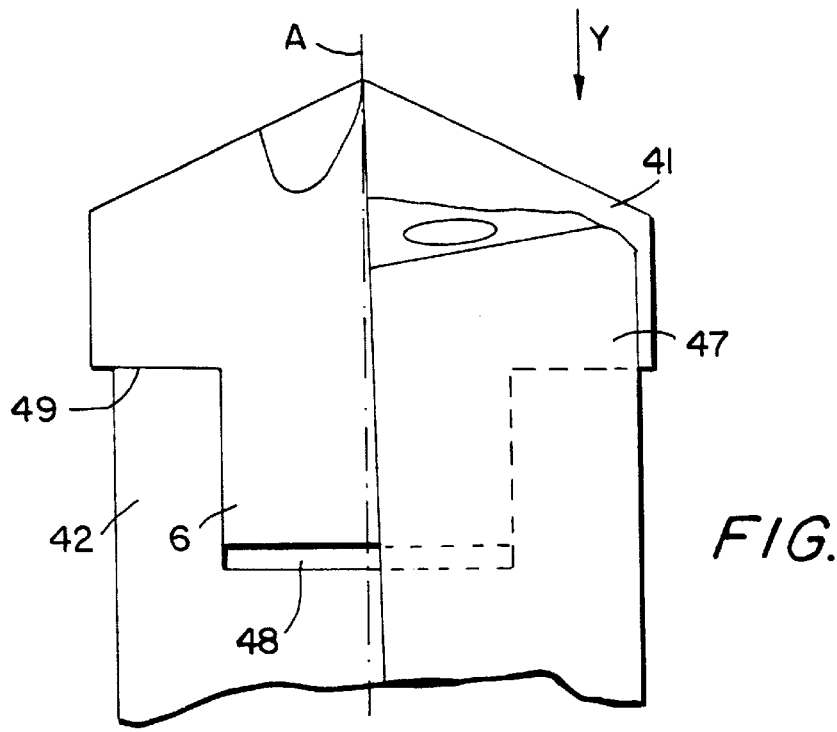
FIG. 11
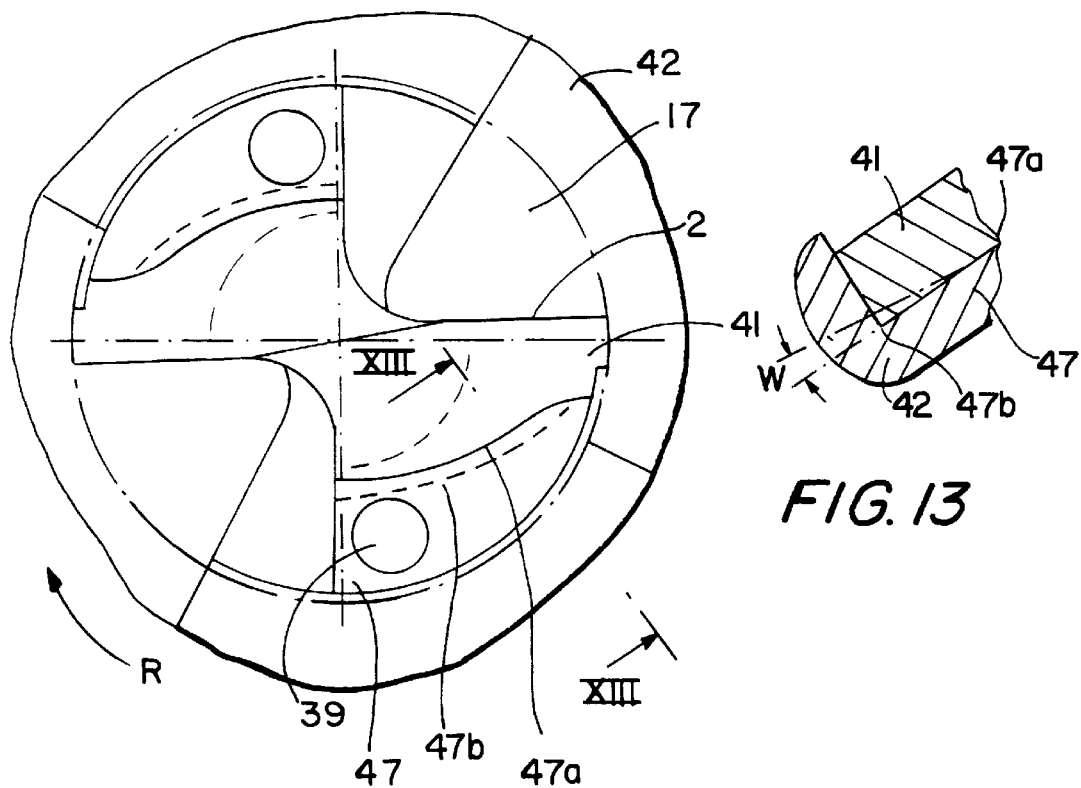
FIG. 13
FIG. 12

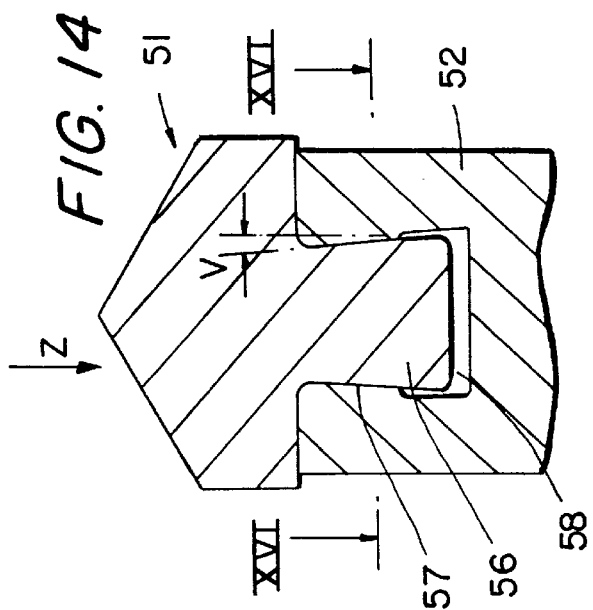
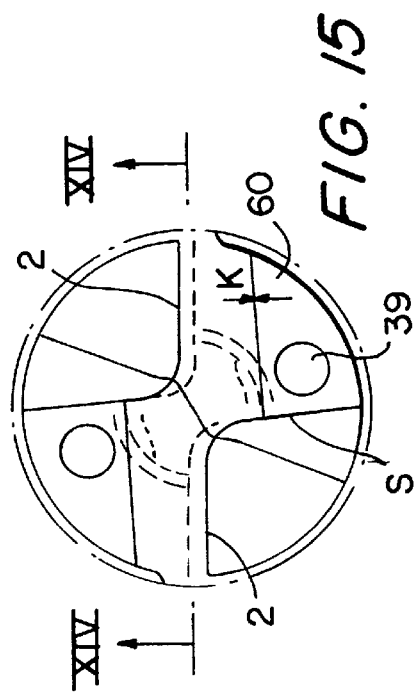
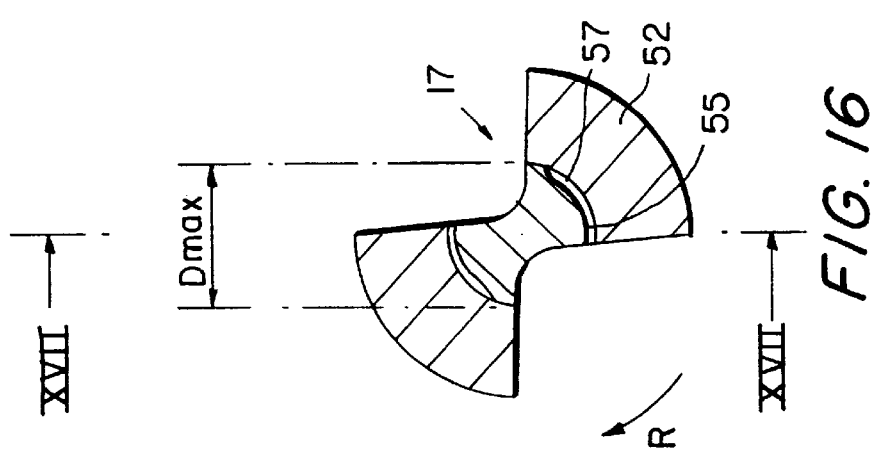

DRILLING TOOL WITH REPLACEABLE BIT

BACKGROUND OF INVENTION

1. Field of the Invention

The invention relates to a drilling tool with a replaceable bit particularly for bores with depths greater than four times the diameter of the bore to be made, the drilling tool being formed in a drill shaft preferably with an integrated chuck shaft for fitting in a machine tool, and with a drill bit to be attached to the drill shaft.

2. Description of the Prior Art

A tool of this type is known from practice, which is suitable for bore depths of up to eight times the bore diameter, and a pilot drill being located centrally in a drilling head. This pilot drill is supplemented on the drilling head by indexable inserts screwed onto the drilling head, of which at least one sits internally in the vicinity of the pilot drill and a further insert sits externally, and thus produces the effective bore diameter. Such drilling heads have a head surface with multiple teeth on the shaft side, which are inserted into complementarily designed projections or returns on the drill shaft, and connect the drilling head with the drill shaft by screws lying in the axial direction. The pilot drill sits in a bore centrally located in the drilling head and penetrating through said drilling head, and extends into a central blind bore in the drill shaft. The pilot drill is secured in the drill shaft by a clamp screw located transversely to the drilling axis, and which engages into a corresponding recess on the outer circumference of the pilot drill. In addition, the axis of the pilot drill, which may also be provided with a central cooling duct, can be tilted in the axial direction by means of a set screw to be inserted orthogonally to the axis of the pilot drill laterally in the drill shaft.

Both triangular and quadrangular plates of hard metal are used as indexable inserts.

In a similar embodiment, the pilot drill and the indexable inserts are secured directly at the drill point by clamp screws or clamp claws located transversely to the axis.

In such drills, which are available for a diameter range of 20 to 50 mm or above, problems arise with setting up such drill points due to the asymmetrical cutting conditions, as the pilot drill must be set up precisely with relation to the drilling geometry and the metal to be drilled. The cutting edges of the drills are not continuously distributed over the radial circumference, and the cutter blades lie a small extent behind the point of the pilot drill. This gives rise to considerable problems when initially drilling workpieces provided with rotary centering means or during initial drilling of oblique surfaces which are inclined through more than 4 to 8°. In addition these drills are not suitable for drilling up pre-drilled workpieces, as no centering of the drilling tool relative to the centre of the axis of the bore to be produced is possible. During packet drilling there always arises at the bore outlet a small shoulder, as the pilot drill is already out of cut at this point and the asymmetrical blades push away the material to be machined on one side. For reasons of constructions and material technology such drills also cannot be produced for bore diameters below 20 mm and at the smaller diameters, there is the problem of build-up of chips in the centre of the axis.

On the other hand, the use of normal HSS drills for diameters below 20 mm is uneconomic for many fields of application, particularly with high feed speed and a high cutting speed, particularly for "smearing" materials and large bore depths, as after a short time, due to lack of suitable cooling, the cutting surfaces and guide surfaces overheat and must be reground.

There is known from DE 37 09 878 C2 an HSS drill with a replaceable bit, in which the bit, provided with two complete radial cutters, is placed with its shaft-side surface in a correspondingly formed centering of the head surface of a drill shaft and is connected by means of two threaded pins located parallel to the drill axis, with the drill shaft. The drill can also comprise cooling ducts. Such a constructive type cannot be produced for drill bore diameters below 12 mm, and due to the outlay on time, replacement of the bit is more expensive than the drill.

There is known from DE 33 06 209 C2 a replaceable hard metal insert with a double cutter for smaller-diameter drills. In this case a cutter plate with shaft-side centering pins can be inserted into the centre of the drill shaft in a correspondingly prepared drill shaft, from a specially milled-out chip groove; said cutter plate can be pivoted contrary to the rotary working direction of the drill in a plate seat in front of a drive means on the shaft. Thus the shaft-side surface of the cutter plate can be clamped against a head surface of the plate seat on the drill shaft, the centering pin, during the pivoting movement, executing with its conical peripheral surface a spiralling movement towards the shaft side, thus drawing the cutter plate along with it.

This type of attachment generates tensions in the hard metal plate which are concentrated in the throat between pin and plate as superimposed bending and torsion forces. When loads are applied during machining, the hard metal insert then becomes liable to breakage at this point. Therefore this arrangement has not become commonly used in practice.

SUMMARY OF THE INVENTION

It is an object of the present invention to develop, particularly for bores in the range from 5 mm up to about 50 mm, an economical and precisely-cutting drill, in which the advantages of the drilling tool with a pilot drill are exploited, but its disadvantages are avoided, and in which depths of up to eight times the diameter are achievable.

The invention proceeds from the basic idea that a replaceable drill bit is mounted on or optimally shaped drill shaft, with a view to correspondingly large chip removal grooves, a supply of coolant and high stability for large drilling depths of up to about eight times the bore diameter, the most varied drilling tasks may be carried out by said drill bit. In this respect only used in all mechanical workshops are considered as a rule these drill shafts are made of HSS or HSSE tool steel, and have an integrated universal clamping shaft for correspondingly accommodating tools in machine tools. The drill shaft cannot consist of hard metal, as the possible torsion in the case of the diameters and drilling depths in question would be greater than the breaking resistance of this material. Other cutting materials such as ceramics or diamond are too expensive for drill shafts.

The drill tool of the present invention replaces both commercially-available drill tools for small bores from 10 mm up and also the tools previously used with pilot drills, as it is more cost-effective only to replace the drill bits than complicated drilling tools, or to scrap the likewise conventional helical drills after use. In this respect it is also possible to use the conventionally used indexable inserts and to achieve similar drilling performance as with hard metal drills or drills fitted with diamonds or ceramics or such with a soldered-in but heat-sensitive hard metal bit or to achieve for the larger bores the performance of the known drills fitted with cutter plates, with the same drilling quality and rotational precision.

Therefore the drill tool of the present invention carries at its bit a detachable, positively-secured drill bit, the drill bit having at least two cutting edges located symmetrically to the axis of the tool, each of which moves fully over a radius of the bore, removing chips. The drill bit further comprise an integrated attachment device located on the drill bit, with at least one axial centering means and drive devices located radially at the circumference or on their peripheral surface, e.g. two oppositely-lying drive devices. The drive devices are insertable into complementarily formed attachment devices on the drill shaft and may be secured at that point by fixing members which may be introduced transversely to the axis, such for example as screws.

Alternatively to positioning such drive devices on the periphery on the drill bit, these may also be attached to the axial centering means or, in addition to these, ensure double security during attachment.

A second general solution resides in the fact that, instead of the drive device to be separately attached to the drill bit, the drill bit and the drill shaft are provided on their ends engaging in one another with a clamping connection generated by rotation of the drill bit in the drill shaft. In this case the contact surface of the parts is designed as a press fit and/or the drill bit is rotated as far as a stop on the drill shaft. Using undercuts, a positive-fit locking in the axial longitudinal direction of the tool may simultaneously be achieved.

For bores from about 5 mm diameter, the drill bit can preferably consist integrally of homogeneous material and have integrated cutter edges which, seen from the axis, extend in plan view in a way inclined approximately rectilinearly radially outwards and backwards. For larger bore diameters from about 12 or 15 mm upwards, the cutter edges may be divided into a plurality of cutters, with at least two cutters per radius. The inner of these cutters, which extends as far as the axis of the drilling tool, comprises homogenous material and is integrally connected with the body of the drill bit. The outer cutter or cutters are formed from cutter plates, which consist for example of hard metal. This design of the bit is used when no or only a small transverse cutter is attached, or if the transverse cutter is pointed. In the case of drills with a tetrahederal grinding, the preceding description relates not to the transverse cutter, which is formed according to the invention additionally out of the homogeneous material of the drill bit.

Commercially-available indexable inserts in triangular or quadrangular form may be used. Contrary to the shaft, the drill bits, due to their low torsion loading, can also consist of hard metal or powder metal, or can be made from hardened tool steel. This tool steel may also be provided at the point of the drill, which is formed by the cutter edges and if necessary also on the machining surfaces and free surfaces, additionally with a coating reducing the cutting forces and frictional forces, e.g. of titanium carbide or titanium nitride.

The drive device at the drill bit in a preferred embodiment substantially consists of recesses on the periphery of the drill bit, which may be pushed over congruent drive blocks secured to the drill shaft, or in which the drill shaft also has corresponding recesses, so that a drill block common to both parts, insertable into the recesses in both parts, can be used. Thus the drive blocks can sit with their pressure surface in the radial direction or parallel therewith in the drill bit. Preferably, the side of the drive block acted on by the machining forces is however located roughly parallel to the cutter edge, so that the core of the drill bit is not unnecessarily weakened.

The advantage of such an arrangement is that the couplings or attachment devices centre the drills with tolerances of a maximum $\frac{1}{100}$, so that the exact seating of the drill bit on the drill shaft and a precise drilling result is guaranteed. This is independent of the cutter configuration and depends merely on the precision of the attachment members to be coupled. In order to achieve this precision, drilling tools according to prior art, which operate with pilot drills, could only be set after test drillings in the corresponding material with corresponding drill depths to a precise position for exact drilling, which was not least due to the asymmetrical cutting edge formation of such tools.

Instead of the previously-named drive blocks which, being roughly parallelepipedic, may be screwed into corresponding recesses on the drill shaft and the drill bit, it is likewise possible according to the invention to use drive blocks which in the position of use have key heads inclined towards the clamping shaft, so that when the blocks are screwed in, a clamping effect is exerted in the direction of the clamping shaft on the drill bit. This naturally assumes complementarily formed wedge-shaped surfaces on the drive grooves of the drill bit.

The radial drive means may comprise pins on the drill bit to be introduced into a bore in the drill shaft, so that only the screw for fixing the drill bit in its axial position relative to the drill shaft and located orthogonally to the drill axis, need be introduced from the periphery of the drill shaft. Naturally, the reverse principle is possible, namely that the drill shaft has a pin, which engages in a corresponding bore on the drill bit. In this case also the corresponding drive grooves and drive blocks are usable. This drive device is known per se for example from WO 89/08519.

In an alternative form, the groove blocks are already secured by corresponding connection techniques, e.g. soldering, welding or adhesives, to the drill shaft, and the drill bit is secured by pushing the drive grooves vertically over, or a combined vertical rotational pre-fixing of the drill bit in the drill shaft, such as a bayonet fixture, and subsequent securing by means of the previously described screw. In addition, according to the invention, the drill bit is equipped at the shaft or the alternative recess with returns or projections, which enable centering of the drill bit on a processing machine, e.g. for regrinding the drill bit.

The engagement of the securing screw, which engages through the drill shaft and into the pins or through corresponding bores in the drill bit, can be so designed that the screw is inserted through a thread on the drill shaft itself or into the previously described drive blocks transversely to the drill axis, and is locked in corresponding blind holes in the pin of the drill bit in an axial direction.

In another second solution according to the invention, it is possible to omit the previously described drive devices. In this case the drive means are integral moulded parts on the head of the drill shaft, bringing about a positive fit or frictional fit with the drill bit. In one version, combined frictional and positive fit is produced between the circumferential or peripheral surface connecting with the free surface machining surface of the drill bit on the one hand, and a pin-like projection on the drill shaft on the other hand. This projection widens in the fixing rotary direction of the drill bit, which simultaneously corresponds to the direction of the machining forces acting on the cutter edge, in the direction of the axis of the drilling tool, and thus forms a wedge-shaped surface with key angles of up to 10°, preferably up to 5° due to the self-locking action (small friction angle) thus coming into effect. In a genuine symmetrical two-cutter tool, centering of the drill bit in the drill shaft can be effected simultaneously. For fixing in the axial direction, this projection may at the same time be provided with an undercut, preferably likewise an oblique wedge-shaped surface, into which a complementary peripheral surface of the drill bit engages.

In a second version, centering of the drill bit in the axial and radial direction is produced on the pin of the drill bit. Inserted into a concentric bore in the bore shaft is a pin, which has an increasing diameter in its fixing rotary direction, and which maximally can generate a press fit in the concentric bore. As in this case the forces to be transmitted are less than in the first version, the drill shaft is preferably provided with projections, against which a complementarily formed peripheral surface of the drill bit can stop and thus the machining forces are transmitted directly into the drill shaft. In this version the pin/bore pairing can be cylindrical or the pin can have a conical form thicker towards the drill shaft, with a corresponding formation of the counter-surface on the drill shaft. This is possible if the machining groove or the projections on the drill shaft are so formed that the drill bit can be pushed laterally between the projections.

In all versions in which the drill shaft has axial projections for connection to the drill bit, the coolant bores may advantageously be passed through these projections as far as the machining surface or can be directed at the drill bit onto the cutting edges.

Such a drilling tool is preferably used for drilling in the solid material or for drilling up metals, preferably also for materials which form long chips, as long as the bores have a diameter of about 5 to about 50 mm. Smaller bores can no longer be cost-effectively produced with this system, if a bore for coolant liquids is necessary, and larger bores are better made with other tools. In the case of small drills however, long chips can prevent deep drilling, so that in supplement to the invention the cutters are to be provided with notches, chip-breaking grooves or other devices known per se which produce breakage of the chip. According to the invention, the cutter edge can also be stepped for this purpose.

A further preferred use of this drilling tool arises during packet drilling, i.e. drilling of plates stacked one above the other, which must be completely drilled through. The type according to the invention of design of the cutter edge and also of the correspondingly backwardly directed angle of the cutter edge make it possible here to produce such a bore perfectly and without shoulders. In the drilling tasks indicated, among which also belongs the initial drilling of oblique workpiece edges, the cutter edges should be so designed that the ratio of the inner cutter to the overall length of the cutting edge comes to about 1:2 to 1:10, preferably about 1:3 to 1:6.

Thus the inner cutter can be located by 20 to 600%, with respect to its cutting width, in the direction of drilling depth in front of the outer cutters.

Finally, the outer diameter of the inner cutter can project beyond the inner diameter of the outer cutter by a maximum 5 mm in the radial direction, so that the initial cut conditions for the outer cutters become more favourable. This requires a conical enlargement, aligned towards the bit of the drilling tool, of the projection which terminates in the inner cutter. In this way also the problem is avoided that indexable inserts or soldered-in hard metal cutters frequently fail when the cutting speed in the centre of the drilling tool tends towards zero.

BRIEF DESCRIPTION OF THE DRAWINGS

The invention will be explained in more detail with reference to embodiments given by way of example, without restricting it to the said embodiments. In the drawings.

FIG. 3 a drill shaft according to the invention;

FIG. 4 is a sectional veiw line IV—IV through the drill shaft according to FIG. 3;

FIG. 5 is a view along direction X of the drill shaft according to FIG. 3;

FIG. 6 is a sectional view through line VI—VI of the drill shaft according to FIG. 5;

FIG. 11 shows a fourth embodiment of the drill bit according to the invention;

FIG. 12 is a view along direction Y of the drill bit of FIG. 11;

FIG. 13 is a sectional view through line XIII—XIII of the drill bit of FIG. 12;

FIG. 14 is a sectional view of a fifth embodiment of the invention along line XIV—XIV according to FIG. 15;

FIG. 15 is a view along direction Z of the drill bit according to FIG. 14;

FIG. 16 is a sectional view XVI—XVI of the drill bit according to FIG. 14;

DETAILED DESCRIPTION OF THE PREFERRED EMBODIMENTS

Identical parts or at least parts with identical actions are provided in the following with identical reference numbers.

Figure 1:
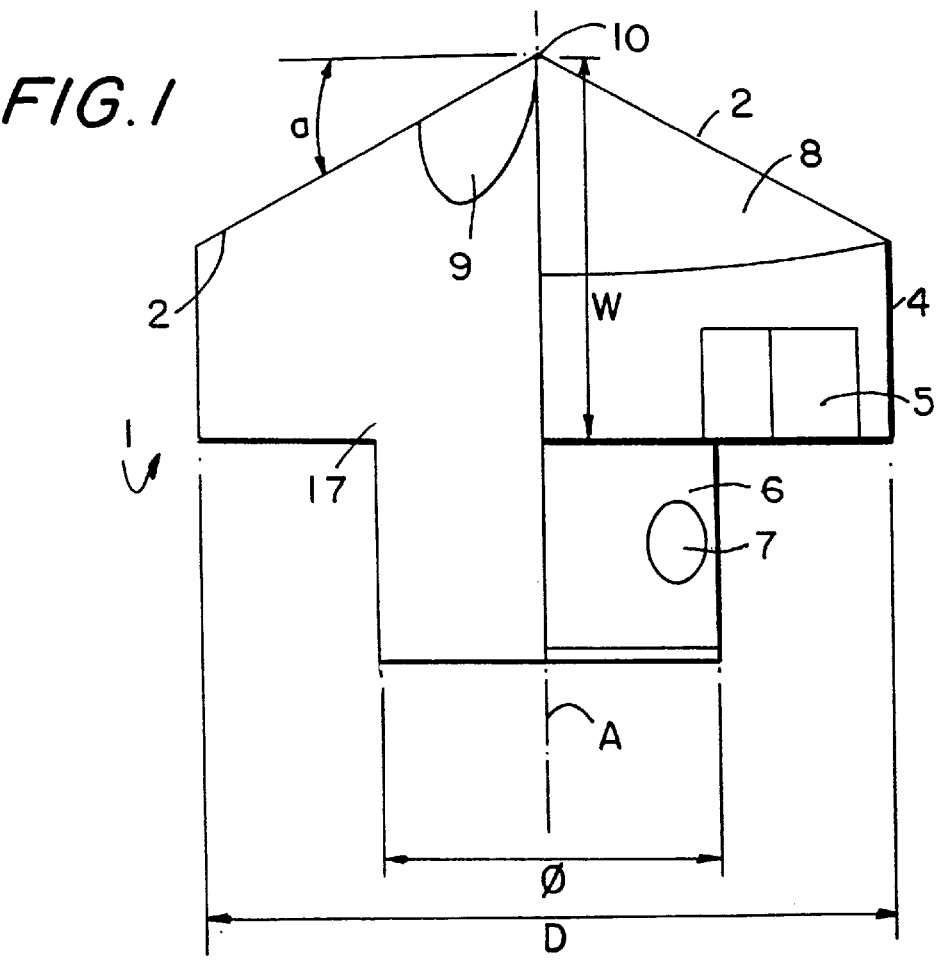
FIG. 1 a side view of a first embodiment of the drill bit.
Figure 2A:
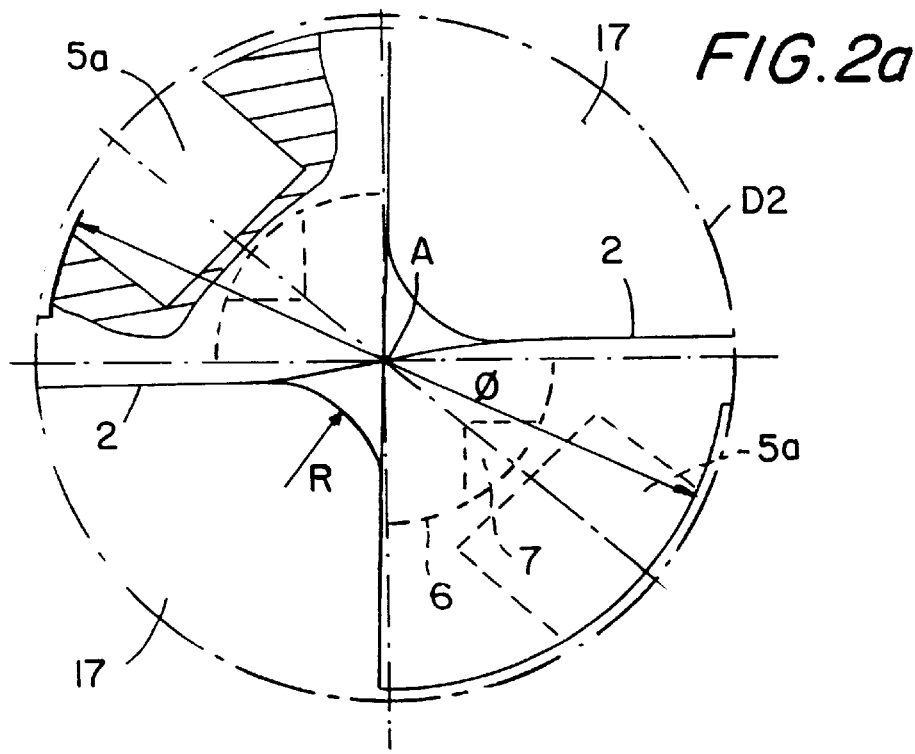
FIGS. 2a, 2b, and 2c are a plan view of the drill bit according to the invention according to or similar to FIG. 1.
Figure 2B:
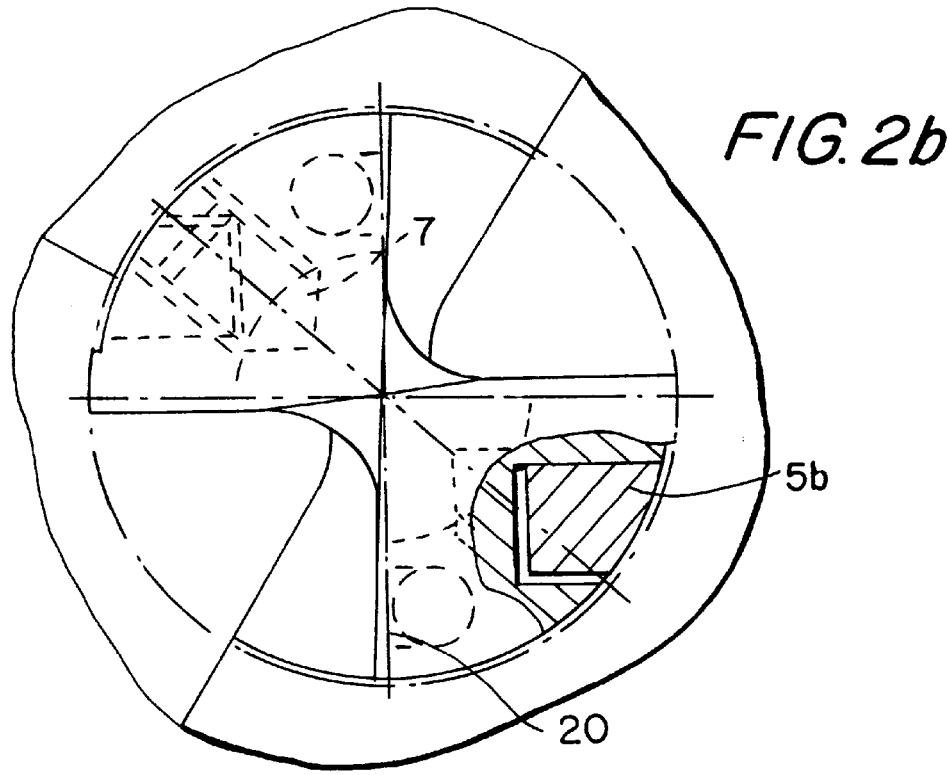
Figure 2C:
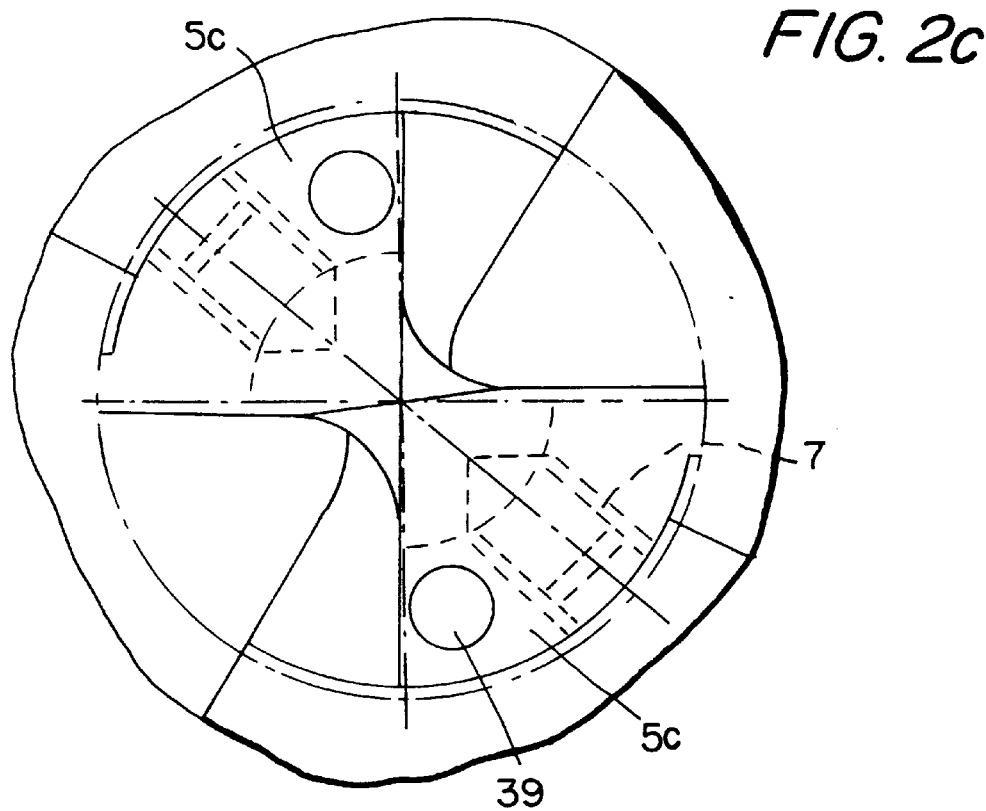

Referring initially to FIG. 1, 2a, 2b, and 2c drill bit 1 for a positive-fitting detachable attachment in a drill shaft (FIGS. 2b,c) has, beginning from its point 10 at an angle inclined backwards and radially outwards a of about 25°, two cutting edges 2, which are enclosed by faces 9 or chip grooves 17 on the one hand and by the free surface 8, the two cutting edges 2 terminate at the peripheral surface 4 so that a bore hole with the diameter D2 can be produced by the drill bit 1. The drill bit 1 is inserted with shaft 6 into the drill shaft and axially secured in blind holes 7 by screws which are not shown. Drive grooves 5 are provided on the periphery 4 of the drill bit or securing it radially. FIGS. 2a and b show various embodiments of drive grooves 5a and 5b. Similarly, FIG. 2c shows a drive means 5c as a projection on the drill shaft. The cutting edges 2 actively remove chips as a radial beginning from the tool point as far as diameter D2, when drilling is carried out into the solid. It is also to be seen that the cutting edges 2 are located symmetrical to the axis A of the drill bit. In this way a uniform distribution of force, or rather an identical moment of force is to be expected relative to the axis, and a precise centric bore may be produced. FIGS. 1, 2a, 2b and 2c show a five to ten times enlargement of a fine drilling bit, by means of which bore diameters can be precisely produced within a tolerance of ±1/100 mm. The bore variation over a length of 7×D2 lies at a maximum of 2/10 mm.

FIG. 3 shows a receiving means for drill bit 1 with a drill shaft 32 and a clamping shaft 33 for commercially-available machine tools. In continuation of the chip grooves 17 of the drill bit 1, the drill shaft 32 likewise has chip grooves 34.

FIG. 5 shows a view X according to FIG. 3. A contour of the drill shaft 32 is shown in FIG. 4 through a cross-section A—A in FIG. 3. Located centrally in the drill shaft 32 is a blind hole bore 38 (FIGS. 5 and 6) into which a shaft 6 of the drill bit can be inserted, until its expanded head comes into contact with the projections 37, like segments of circles, of the drill shaft 32. A securing screw may be screwed through the threaded hole 35 as far as the corresponding blind hole 7 in the shaft 6 of the drill bit 1, and thus securing the drill bit on the drill shaft 32.

Figure 8:
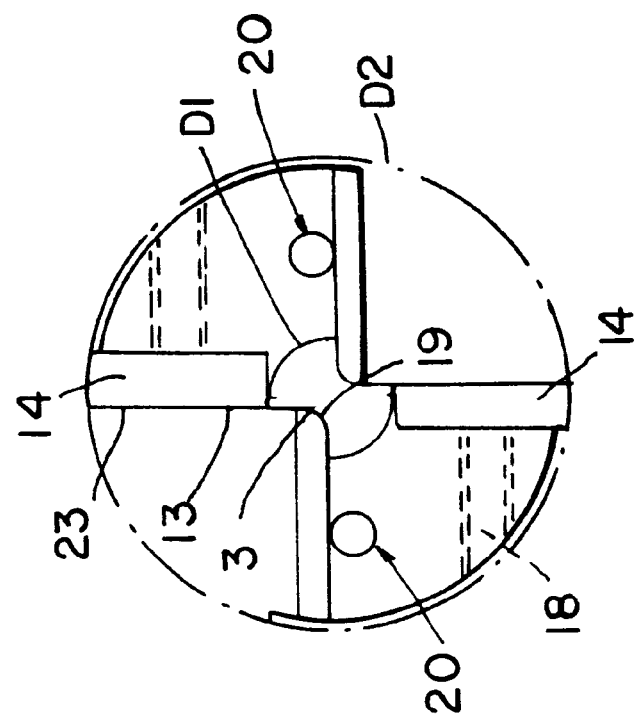
FIG. 8 is a plan view of the second embodiment of the drill bit according to FIG. 7.
Figure 7:
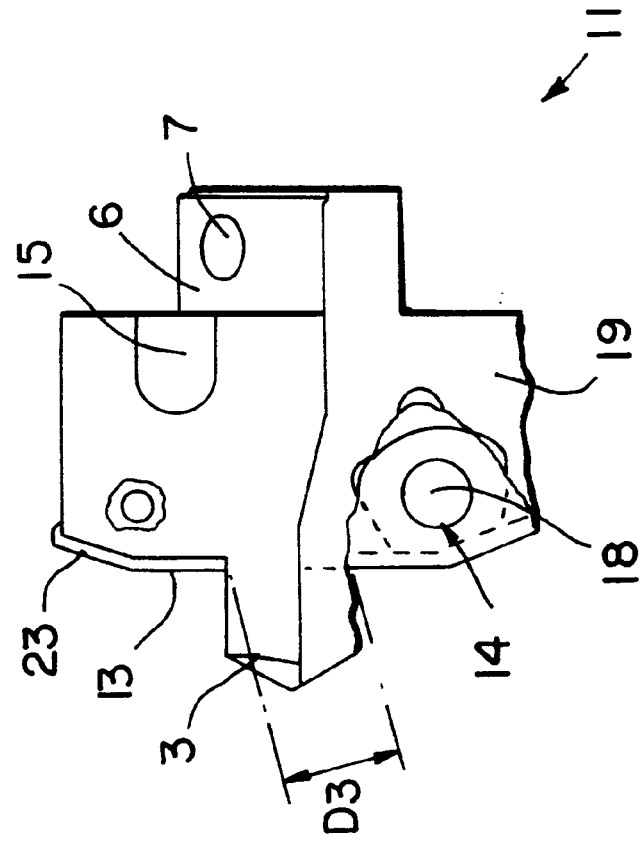
FIG. 7 is a side view of a second embodiment of the drill bit; according to the invention

FIGS. 7 and 8 shows a second embodiment of the drill bit 11 according to the invention for bores with diameter D2. This drill bit also has, for attachment on the drill shaft (FIG. 3), a shaft 6 and a securing hole 7 and drive grooves 15. However, in this case the drill bit 11 has a cutting edge divided into three cutters 3, 13, 23, which together correspond to the radius of the bore D2. The cutter 3 close to the centre is formed by a projection of the drill bit integrated as one piece in the body, while the further radial parts of the cutter edges are formed by cutters 13 and 23 on cutter plates 14, which extend as far as the periphery of the drill bit corresponding to the diameter D2 to be produced. The two cutters 3 form a the diameter D1 that is wider than the concentric parts left free by the cutters 13 and 23, here identified by D3. In this way the diameter D1 is cut slightly larger than required by the gap between the cutter 13 and the axis of the drill bit, defined by D3. In this way there is an additional free cutting of the pre-drilled area D1 and a favourable initial cut condition for the cutters 13. The cutter 23, which is a part of the indexable insert cutter plates 14, can be secured by means of a detachment means 18 on the drill bit 11. The cutter 23 is inclined radially outwards and backwards relative to the cutter 3 or axis A. The cutter edge 13 could also be inclined in an identical way. It is likewise possible for the cutters 3,13,23 to be located on a projection line so that, similarly to the cutter 2 in FIG. 1, a common rectilinear cutting edge results. Such an arrangement is particularly interesting for boring and packet drilling of metallic workpieces, as in these cases there are no problems with centering or forming a pinch edge upon emergence from a stack of plates to be drilled as a packet.

FIG. 8 shows in plan view of drill bit 11, and it can be seen that a cooling duct 20 may also be introduced, in order also to cool the drill bit, the coolant fluid being passed through the drill shaft by means of corresponding coolant ducts 39 (FIGS. 3 to 5). The cutter plates 14 can be in the form of triangular or quadrangular one-sided or double-sided indexable inserts, which are to be disposed by means of the attachment means 18 in a corresponding seat in the area of the chip grooves 19 of the drill bit. In this case powder metals, which are compressed to form corresponding plates, are used as hard metals; in the same way, however, other hard metals or cutting ceramics can be used. The invention is not limited to the use of specific cutter plates. The entire drill bit 11 preferably consists of hardened tool steel HSS steel, or from hard metals themselves. The actual point of the drill in the area of diameter D1, including the cutting edges 3 and the chip surfaces and free surfaces, are preferably provided with coatings reducing the cutting forces and feed forces, i.e. titanium carbide or titanium nitride.

Figure 9:
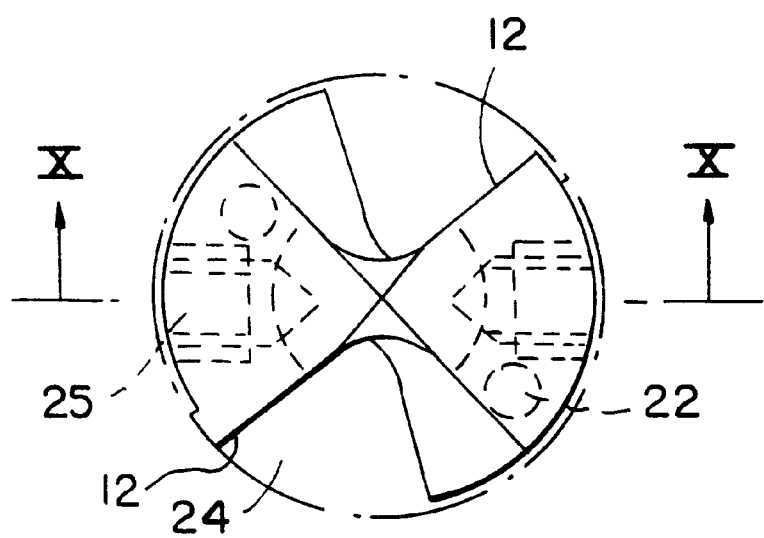
FIG. 9 is a plan view of a third embodiment of the drill bit according to the invention

FIG. 9 shows a third embodiment of the drill bit 21, similar to the embodiment according to FIGS. 2 or 1, in plan view. At the same time, in combination with FIG. 10, the attachment of such a drill bit is shown by way of example on a shaft 32 (FIG. 3). In the case of the drill bit 21 shown here, with the continuous cutters and cutting edges 12, the chip grooves are slightly twisted, in order to achieve favourable chip removal for material forming long chips. It may also be seen from the cross-section C—C, which is off-set through 90° to the chip grooves 24, and intersects the axis of the drilling tool, according to FIG. 10 that the drill bit 21 can be secured in the shaft 32.

Figure 10:
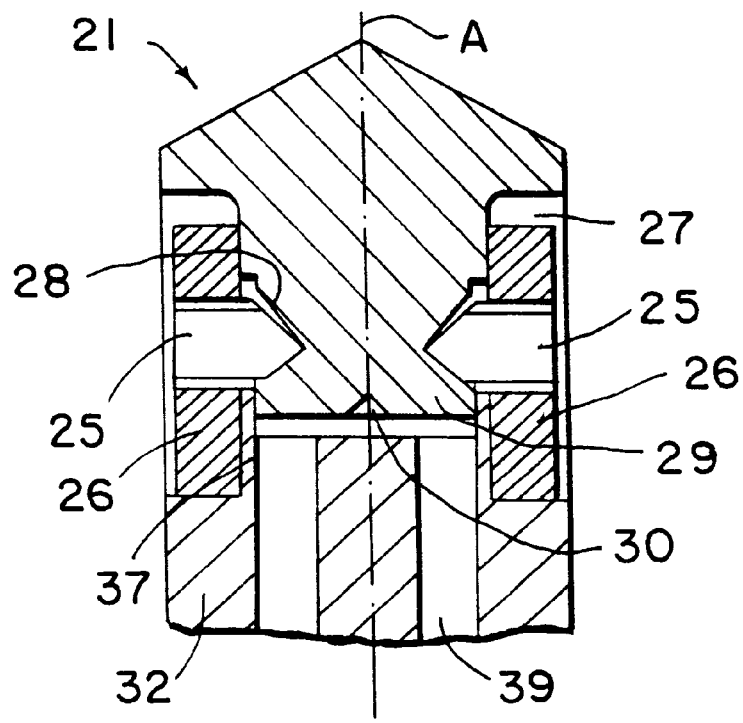
FIG. 10 is a sectional view through the line X—X according to FIG. 9.

In the explanation of FIG. 10, the numbering of the parts in FIGS. 3 to 6 and the corresponding description thereof is to be used. The drill bit 21 has on its end aligned towards the shaft 32, concentrically with the axis A, a shaft 29, which is provided laterally with an inset centering bore 28. This shaft, formed in congruent manner with the drill shaft 32, can be inserted into a corresponding bore 38 (FIG. 6) until it contacts with parts of its contour against the projections 37. Laterally, the shaft 32 has openings, into which drive blocks 26 may be inserted. By means of a centering screw 25, which is screwed through a corresponding thread in the drive blocks 26, the shaft can be secured by the screw 25 in the blind hole 28 in an axial direction. The drill bit can be secured and positively clamped against torque by the drive blocks 26, which extend both into corresponding openings on the drill shaft and also into the drive grooves 27 in the drill bit 21. Coolant can be supplied via coolant ducts 39 in shaft 32 and ducts 22 in the drill bit 21 to the cutters 12 by means of a pump device not shown. If required, the drill bit can be reground; a recess 30 in the shaft of the drill bit 21 is provided for corresponding centering.

In the embodiment according to FIG. 11 a drill bit 41 has an external diameter of 8 mm and a cylindrical pin 6, which is inserted into a bore 48 of a shaft 42. The drill bit 41 is locked in the drive device 47, which is in the form of a curved, segment-like projection of the drill shaft 42.

It can be seen from the plan view according to FIG. 12 that the drill bit 41 has behind the cutter 2, on its peripheral surface, an intense taper, which is formed complementarily to the widening of the segment-like part 47 of the shaft 42. By means of this design it is possible to rotate the drill bit 41 from a preliminary position between the segments 47 to the right in the direction of the arrow R, as soon as the pin 6 is inserted in bore 48 and the rear surface 49 of the drill bit abuts against the drill shaft 42. The drill bit 41 is then rotated inwards in the direction of the arrow until it abuts in a clamping manner on the segment 47. Due to the machining forces acting on the cutter 2 during machining operations, this pressure is reinforced, so that release of this clamping action is not possible. In order to avoid shifting in the direction of axis A, which appears impossible due to the drill pressure, but is theoretically possible by jamming of the drill, segment 47 is provided from its end face, identified by edge 47a, as far as an axially deeper-set area of the drill bit, identified by the number 47b, with an undercut, in which the complementarily designed peripheral surface of the drill bit engages.

FIG. 13 shows the undercut angle w between the edges 47a and 47b at a magnitude of about 1 to 8° according to cut D—D in FIG. 12. The segment 47 widens in the direction of axis A with a pitch of about 1–10° and the complementarily formed drill bit is correspondingly tapered.

Figure 17:
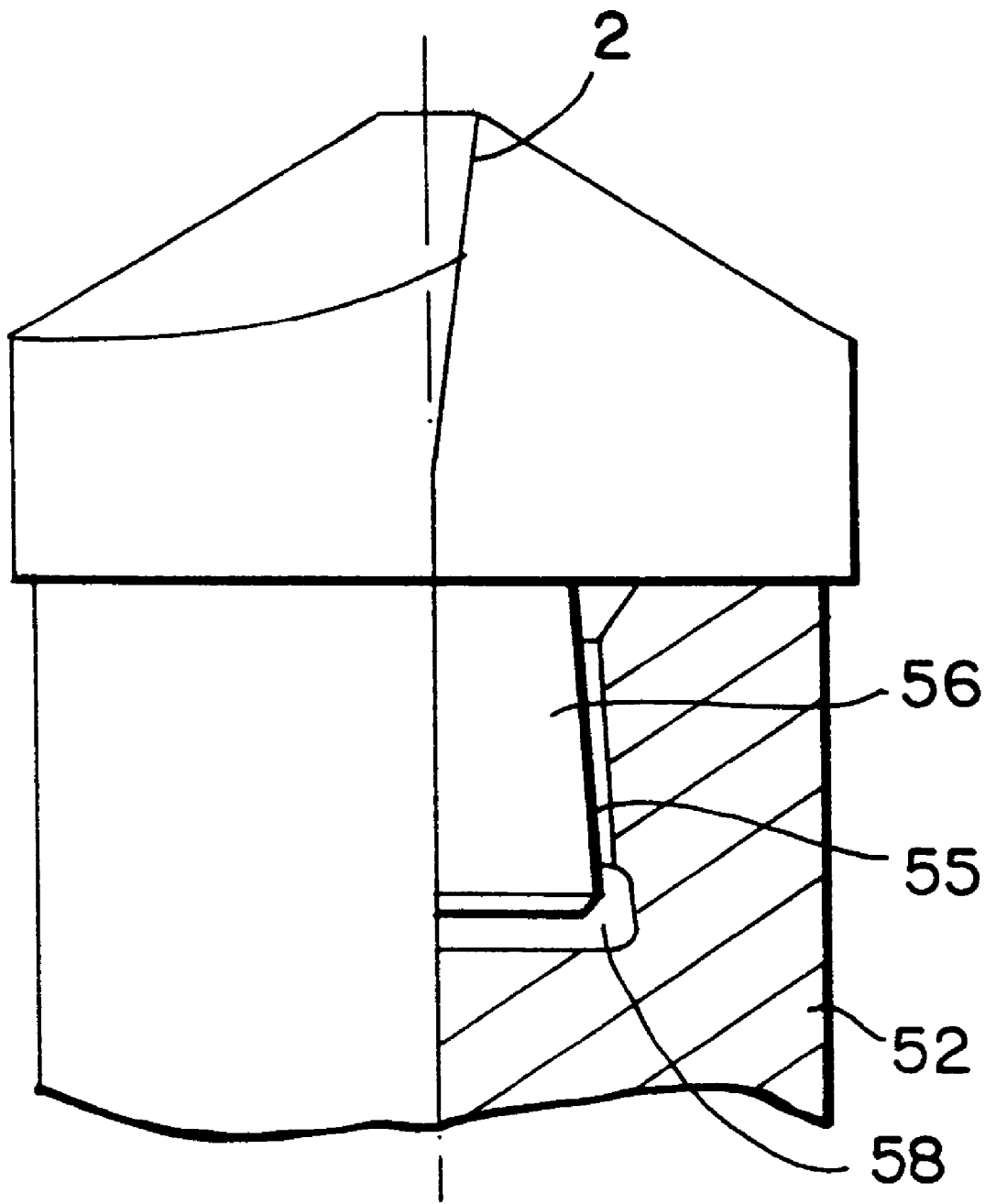
FIG. 17 is a sectional view XVII—XVII of the drill bit according to FIG. 16.

FIG. 14 shows a further embodiment of the drill bit 51 in cross-section F—F according to FIG. 15, FIG. 15 being a view Z of the drill bit 51 as shown in FIG. 14. In this case clamping of shaft 56 in bore 58 of the drill shaft 52 is provided, alternatively to the clamping on the larger periphery of the drill bit behind the cutter area described in FIGS. 11 to 13. Whereas in FIG. 14 according to reference number 57, the pin 56 abuts on the drill shaft 52, FIG. 17 shows in cross-section G—G in FIG. 16 a view of the drill bit rotated relative to FIG. 14 through 90°. From this it can be seen that in this position the drill shaft 52 has a radial clearance 55 relative to the drill bit 51 with pin 56. This radial clearance 55 narrows in the direction of the press fit 57, where the pin has its maximum dimension Dmax; this is to be seen in cross-section E—E in FIG. 16. In this case therefore it is the pin 56 which clamps on the contact point 57 in the drill shaft 52, when the drill bit 51 is rotated in accordance with arrow R (FIG. 16), after the pin 56 has firstly been introduced into bore 58 of the drill shaft. In this case the drill bit 51 can be rotated until it stops against the terminal, wedge-shaped projections 60 at the contact point K of the drill shaft 52; it thus forms in the direction of axis A with the projection gap S, which serves for insertion of the drill bit 51 into the shaft 52.

The pin 56 of the drill bit can in this case be cylindrical to conical in form, in order to produce the effect of the angle w described with reference to the drill bit 41. In this case the angle is identified with v; it is 0–8° in size. In the case where the angle V=0°, the pin 56 as before in the version described according to FIG. 10, part 25, be secured in an axial position. Securing in an axial position is also possible if the cylindrical pin is given a collar, which sits in the undercut 58 (FIG. 14), so that the pin is not drawn out of the drill shaft.

The rear surface on the shaft side of the drill bit 51 and the head surface of the drill shaft 52 need not abut in a plane manner on one another in the assembled condition. To this extent FIG. 14 shows an idealised diagrammatic condition. In drilling work, the reaction of the feed force, direction Z in FIG. 14, ensures pressure of the point (not necessary) on the shaft of the drill. The only decisive factor is that the pin 56 (FIG. 14) or other peripheral parts (FIG. 12) of the drill bit are radially clamped.

The drill bits 1, 11, 21, 41 and 51 have a diameter D and a working length W as shown in FIG. 1. The drill bits 1, 11, 21, 41, and 51 are considered to be short drill bits in that the working length W is shorter that the diameter D in each case. Accordingly, the drill bit 1 is normally connected to a drill shaft 32, 42, or 52 for drilling bores longer than the working length of the drill bit.

While there have been shown and described and pointed out fundamental novel features of the present invention as applied to preferred embodiments thereof, it will be understood that various omissions and substitutions and changes in the form and details of the devices illustrated, and in their operation, may be made by those skilled in the art without departing from the spirit of the present invention. For example, it is expressly intended that all combinations of those elements which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A drilling tool for drilling a bore having a depth greater than four times a diameter of the bore, comprising:

a drill shaft having a first end and a second end, said first end having a clamp shaft for attachment to a machine tool;

a drill bit having an attachment end and a cutting end, the attachment end detachably connected to said second end of said drill shaft and said cutting end comprising two cutting edges located symmetrically to a longitudinal axis of the drilling tool;

said attachment end of said drill bit comprising drive devices on a radial periphery for receiving a drive force form said drive shaft;

an attachment device having a first element on said second end of said drill shaft and a second element on said attachment end of said drill bit for axially centering said drill bit;

complementary formed devices on said second end of said drill shaft for receiving said drive devices, said drive devices being securable in said formed devices by fixing elements which are fixedly insertable transversely to the longitudinal axis of said drilling tool; and wherein said entire drill bit is integrally formed from a homogeneous material comprising one of powder metal, diamond metal, and ceramic metals; and wherein said drill bit has a diameter and said drill bit and said drill shaft together have an overall length greater than four times said diameter of said drill bit.

2. The drilling tool of claim 1, wherein each said two cutting edges extend radially outward from said longitudinal axis and toward said attachment end in one of a rectilinear and stepped configuration.

3. The drilling tool of claim 1, wherein each said two cutting edges comprises an inner and outer cutter, wherein said inner cutter comprises said cutting material and said outer cutter comprises a cutter plate fixedly connected to said drill bit.

4. The drilling tool of claim 1, wherein said drill bit comprises a short drill bit, said diameter of said drill bit being less than or equal to 50 mm, and a working length of said drill bit comprising a length of said drill bit that excludes said drive devices and said second element of said attachment device, said working length of said drill bit being less than said diameter.

5. The drilling tool of claim 1, wherein said cutting material has a coating comprising one of a friction-reducing agent and a wear-reducing agent.

6. The drilling tool of claim 1, wherein said drive device comprises an opening on the peripheral surface into which a drive block is insertable, said drive blocks projecting beyond the drill shaft.

7. The drilling tool of claim 6, wherein said complementary formed device comprises a T-shaped groove and blocks.

8. The drilling tool of claim 1, wherein said drive devices comprise a key head inclined toward said clamp shaft of said drill shaft and are fixedly connectable to said drill shaft such that said key head axially clamps said drill bit with respect to said drill shaft.

9. The drilling tool of claim 1, wherein said attachment device for axially centering said drill bit comprises a pin projecting from said attachment end of said drill bit and insertable into a bore in said second end of said drill shaft.

10. The drilling tool of claim 9, wherein said pin comprises depressions for receiving a screw.

11. The drilling tool of claim 10, wherein said drive device and said complementary form device comprise said pin and said depressions.

12. The drilling tool of claim 9, wherein depressions are made at the center of said pin on said attachment end as a centering means for rotary processing of said drill bit.

13. The drilling tool of claim 9, further comprising projections located at an end face of the pin.

14. The drilling tool of claim 1, wherein said attachment device for axially centering said drill bit comprises a bore in said attachment end of said drill bit insertable over a projection on said drill shaft.

15. The drilling tool of claim 1, wherein said drive devices extend substantially parallel to said cutting edges.

16. The drilling tool of claim 3, wherein said inner cutter projects axially from said outer cutter by a length in the range of 0.2 to 6 times a breadth of said inner cutter.

17. The drilling tool of claim 3, wherein said inner cutter projects beyond a radially inner edge of said outer cutter by a distance not greater than 5 mm in the radial direction.

18. The drilling tool of claim 3, wherein a ratio of a length of a cutting edge of said inner cutter to an overall cutting length of said drill bit is 2:10.

19. The drilling tool of claim 1, wherein said each said two cutting edges extend radially outward from said longitudinal axis and toward said attachment end at an angle in the range of 10° to 30° from a line that is normal to said longitudinal axis of said drill tool.

20. A drilling tool for drilling a bore having a depth greater than four times a diameter of the bore, comprising:
  a drill shaft having a first end and a second end, said first end having a clamp shaft for attachment to a machine tool;
  a drill bit integrally formed from a homogeneous material and having an attachment end for detachably connecting said drill bit to said second end of said drill shaft and a cutting end, the attachment end comprising a drive device for receiving a driving force from said drill shaft and said cutting end comprising two cutting edges located symmetrically to a longitudinal axis of the drilling tool;
  wherein said drill bit has a diameter and said drill bit and said drill shaft together have an overall length greater than four times the diameter of the drill bit;
  wherein said attachment end of said drill bit comprises a first attachment device having a first frictional surface and said second end of said drill shaft comprises a second attachment device having a second frictional surface on a outer peripheral surface of said drill shaft such that when said drill bit is rotated about a longitudinal axis of said drilling tool, said frictional surfaces hold said drill bit onto said drill shaft in a friction-locking connection and said second end of said drill shaft further comprises a complementary drive element such that said attachment end of said drill bit abuts the complementary drive element of the drive shaft when said frictional surfaces are in said friction-locking connection.

21. The drilling tool of claim 20, wherein each said two cutting edges extend radially outward from said longitudinal axis and toward said attachment end in one of a rectilinear and stepped configuration.

22. The drilling tool of claim 20, wherein each said two cutting edges comprises an inner and and outer cutter, wherein said inner cutter comprises an integral part of said drill bit and said outer cutter comprises a cutter plate fixedly connected to said drill bit.

23. The drilling tool of claim 20, wherein said drill bit comprises a material comprising one of hard metal, powder metal, diamond metal, ceramic materials, and hardened tool steel.

24. The drilling tool of claim 23, wherein said cutting material has a coating comprising one of a friction-reducing agent and a wear-reducing agent.

25. The drilling tool of claim 20, wherein said drive device comprises an opening on the peripheral surface into which a drive block is insertable, said drive block projecting beyond the drill shaft.

26. The drilling tool of claim 25, wherein said complementary drive element comprises a T-shaped groove and blocks.

27. The drilling tool of claim 20, wherein said complementary drive element comprises a key head inclined toward said clamp shaft of said drill shaft and fixedly connectable to said drill shaft such that said key head axially clamps said drill bit with respect to said drill shaft.

28. The drilling tool of claim 20, further comprising an axial centering device including a pin projecting from said attachment end of said drill bit and insertable into a bore hole in said drill shaft.

29. The drilling tool of claim 28, wherein said pin comprises depressions for receiving a screw.

30. The drilling tool of claim 29, wherein said drive device and said complementary drive element comprise said pin and said depressions.

31. The drilling tool of claim 28, wherein depressions are made at the center of the attachment end as a centering means for rotary processing of said drill bit.

32. The drilling tool of claim 28, further comprising projections located at an end face of the pin.

33. The drilling tool of claim 20, further comprising an axial centering device including a bore in said attachment end of said drill bit insertable over a projection on said drill shaft.

34. The drilling tool of claim 20, wherein said drive device extends substantially parallel to said cutting edges.

35. The drilling tool of claim 22, wherein said inner cutter projects axially from said outer by a length in the range of 0.2 to 6 times a breadth of said inner cutter.

36. The drilling tool of claim 22, wherein said inner cutter projects beyond a radially inner edge of said outer cutter by a distance not greater than 5 mm in the radial direction.

37. The drilling tool of claim 22, wherein a ratio of a length of a cutting edge of said inner cutter to an overall cutting length of said drill bit is 2:10.

38. The drilling tool of claim 20, wherein said each said two cutting edges extend radially outward from said longitudinal axis and toward said attachment end at an angle in the range of 10° to 30° from a line that is normal to said longitudinal axis of said drill tool.

39. The drilling tool of claim 20, wherein said frictional surfaces are disposed at an angle within the range 0 to 10° relative to the longitudinal axis of said drilling tool or a circumferential line around said longitudinal axis.

* * * * *